US008140066B2

(12) United States Patent
Kneckt

(10) Patent No.: US 8,140,066 B2
(45) Date of Patent: Mar. 20, 2012

(54) POWER CONSUMPTION REDUCTION LOGIC FOR UNSCHEDULED APSD AND REAL TIME SERVICES

(75) Inventor: Jarkko Kneckt, Espoo (FI)

(73) Assignee: Nokia Corporation, Espoo (FI)

( * ) Notice: Subject to any disclaimer, the term of this patent is extended or adjusted under 35 U.S.C. 154(b) by 594 days.

(21) Appl. No.: 11/208,199

(22) Filed: Aug. 19, 2005

(65) Prior Publication Data

US 2007/0004374 A1 Jan. 4, 2007

(30) Foreign Application Priority Data

Jun. 30, 2005 (GB) .................................. 0513269.1

(51) Int. Cl.
*H04W 4/00* (2009.01)
(52) U.S. Cl. ..................... 455/422.1; 455/424; 455/522; 370/328
(58) Field of Classification Search .................. 455/574, 455/343.1, 422.1, 424, 522 C; 370/401, 370/328
See application file for complete search history.

(56) References Cited

U.S. PATENT DOCUMENTS

| 7,113,498 | B2 * | 9/2006 | Bajic .............................. 370/338 |
| 2004/0072559 | A1 | 4/2004 | Kakumaru et al. |
| 2005/0018624 | A1 | 1/2005 | Meier et al. |
| 2005/0136833 | A1 * | 6/2005 | Emeott et al. ................ 455/11.1 |
| 2005/0138451 | A1 | 6/2005 | Simpson et al. |
| 2006/0252449 | A1 * | 11/2006 | Ramesh ......................... 455/522 |

FOREIGN PATENT DOCUMENTS

EP 1 583 285 A1 10/2005

OTHER PUBLICATIONS

Chen et al., "Power management for VoIP over IEEE 802.11 WLAN." Wireless Communications and Networking Conference, 2004, WCNC. 2004 IEEE. Atlanta, GA, Mar. 21-25, 2004. vol. 3, XP010708196.*
Amendment 7: Medium Access Control (MAC) Quality of Service (QoS) Enhancements, LAN/MAN Committee of the IEE Computer Society, IEEE P802.11e/D11.0, Oct. 2004, 185 pages.
Chen et al., "Power management for VoIP over IEEE 802.11 WLAN." Wireless Communications and Networking Conference, 2004, WCNC. 2004 IEEE. Atlanta, GA, Mar. 21-25, 2004. vol. 3, p. 1648-1653, XP010708196.
Perez-Costa et al., "APSM: bounding the downlink delay for 802.11 power save mode." Communications, 2005. ICC 2005. 2005 IEEE International Conference, Seoul, Korea, May 16-20, 2005. p. 3616-3622, XP010825928.
European Search Report, EPO Application No. 06253458.1-2414, Oct. 25, 2006.

* cited by examiner

*Primary Examiner* — Pierre-Louis Desir
(74) *Attorney, Agent, or Firm* — Locke Lord LLP

(57) ABSTRACT

A system and method for more efficiently scheduling and implementing unscheduled automatic power save delivery service periods between a terminal and an access point. An triggering interval is set for an untrigger flag, the untrigger flag not permitting the implementation of an automatic power save delivery period. Automatic triggering is used unless a plurality of criteria are met, in which case the triggering interval is calculated based upon a plurality of variables. Untrigger flags are set for selected frames based upon the triggering interval, and unscheduled automatic power save delivery service periods are implemented for frames for which the untrigger flag is not set and for which the terminal receives an indication of additional data from a remote source such as an access point.

26 Claims, 11 Drawing Sheets

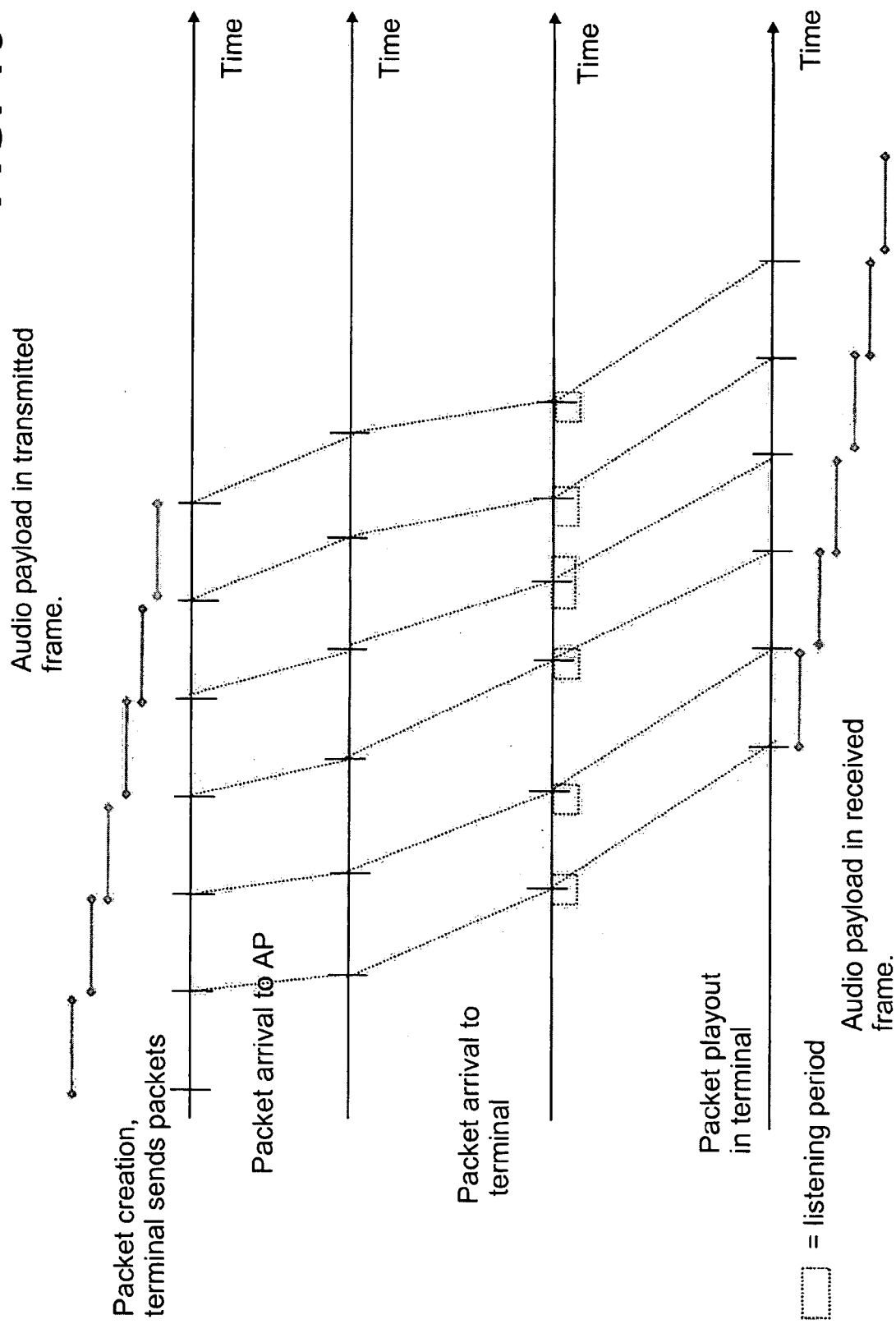

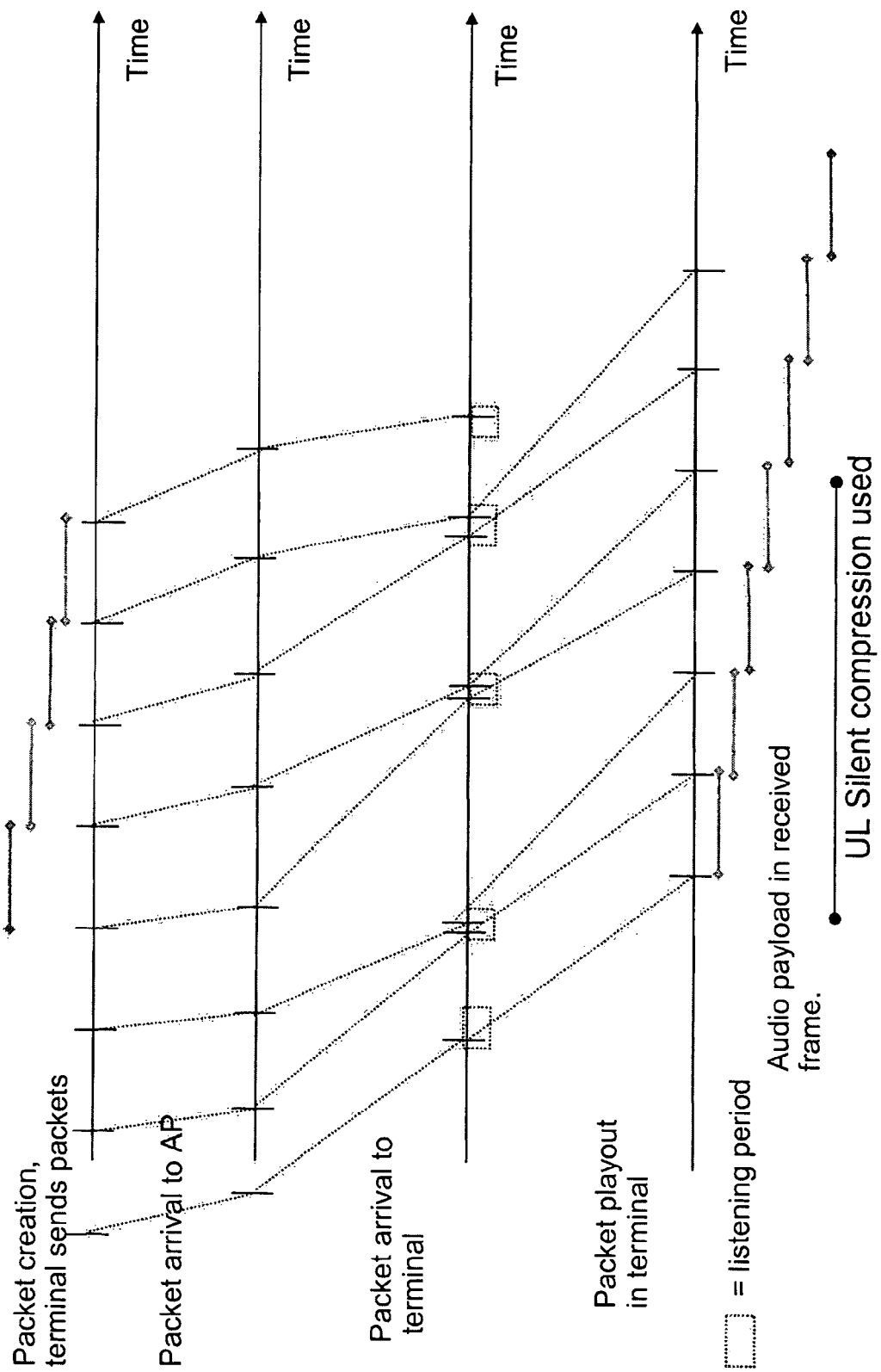

POWER CONSUMPTION REDUCTION LOGIC FOR UNSCHEDULED APSD AND REAL TIME SERVICES

FIELD OF THE INVENTION

The present invention relates generally to the use of automatic power save delivery service periods by terminals within wireless local area networks with Quality of Service media access control enhancements.

BACKGROUND OF THE INVENTION

Wireless local area networks (WLAN) with Quality of Service (QoS) media access control (MAC) enhancements, as introduced in an IEEE 802.11e amendment, are becoming more popular as a media for real time streams. Audio codecs in voice calls generate audio data frames between constant time intervals. If a codec supports a silent compression mechanism, then the audio codec does not generate an audio payload during silent periods. During the silent periods, the audio codec creates only updating frames that contain background noise information. The generation interval of the updating frames is longer than the audio frame's generation interval.

One very important aspect in VoIP calls is power consumption. In order to create a robust and efficient power save mechanism for VoIP calls, the 802.11e standard introduces an unscheduled APSD power save mechanism. The location of an APSD bit 110 in a traffic specification (TSPEC) element 120 is shown in FIG. 1. In unscheduled APSD, the uplink data or management frame operates as a "trigger" frame. The trigger frame starts an APSD service period if it is transmitted from the trigger enabled access point (AP).

In previous versions of 802.11e amendments, the concept of enabling an Accessory Category (AC) to be trigger enabled was introduced. If the uplink frame which is associated with a trigger-enabled AC is sent according to 802.11e, an unscheduled APSD service period is started.

During a service period, the terminal listens to the media on a full time basis and receives transmitted frames from the AP. The service period is terminated when the AP transmits a frame with a set end of service period (EOSP) bit to the station or terminal. After the APSD service period is terminated, the station or terminal can set the receiver off and go into a doze state. With unscheduled APSD (U-APSD), the service periods repeat periodically according to the uplink triggering frames.

FIG. 2 shows the conventional interaction between a terminal 220 and an access point 230 during a downlink silent compression period for purposes of unscheduled APSD service periods in greater detail, wherein the uplink has ongoing data transmission and all transmitted frames are triggering. As shown in FIG. 2, for each U-APSD service period 245, the terminal 220 first transmits a QoS data frame to the access point 230 and the transmitted QoS data from the terminal starts the service period at step 250. This information is acknowledged by the access point 230 at step 255. The period from the initiation of step 250 to the end of step 255 constitutes the transmission opportunity for the terminal 220. Later, and at step 260, the access point 230 transmit a QoS Null, EOSP=1 signal to the terminal 220, which is acknowledged at step 265. The EOSP=1 information indicates the end of the U-APSD. The time from the initiation of step 260 to the end of step 265 constitutes the transmission opportunity for the access point 230.

In the event that the access point 230 has additional data to transmit, then it will follow its acknowledgment with QoS Data and the same EOSP=1 signal at step 275.

The streaming services transmit payload data in only one direction. Therefore, the delay requirements for streaming class services are much more loose than in bidirectional calls. Some streams transmit to other directional QoS report frames. These frames are used to provide feedback to the originator of the stream.

The received data frames are buffered in order to smooth the delay variation of the received frames. The duration of this buffering should be larger or equal to the maximum delay of the received frames. If a frame is received after its playout time has elapsed, then the frame is considered to be lost.

U-APSD logic for service period reduction may increase delays or delay variation of the received frames. This is due to the fact that the terminal triggers DL transmissions only between constant time periods. Therefore, the frames are not delivered from the AP to the terminal as soon as they arrive at the AP. Instead, they are delivered upon triggering. The possible delay increases may be addressed by using large a jitter buffer of constant size or adaptive jitter buffering that adapts to data flow conditions.

A terminal includes decision logic for estimating the total delay of the frame forwarding and deciding whether the number of listening periods may be reduced without causing an unacceptable delay and frame loss levels for the stream.

SUMMARY OF THE INVENTION

The present invention specifies an operation logic for stations to control unscheduled APSD service periods used during VoIP calls. The present invention involves the use of general rules for an indicator frame. If downlink audio frames are using a silent compression feature, then the service periods should be started between the silent compression frames' transmission interval. The present invention contains logic for defining an optimal interval to transmit trigger frames with a set 'untrigger flag' bit.

The present invention specifies operation logic for stations to control power consumption during VoIP calls with unscheduled APSD and when transmitted data in the uplink direction does not have any traffic, or when uplink frames are transmitted less often than downlink frames. Silent compression may result in more seldom uplink frame transmission. Individual stations can reduce power consumption by transmitting trigger frames less often.

The present invention also involves the use of a general rule set for the frequency of trigger frame transmission. These rules include the channel quality, a delay bound value, playout jitter buffer operation and an application data transmission model for the trigger frame transmission frequency selection.

The present invention reduces the number of service periods and unnecessary QoS-Null frames transmitted to terminate the unscheduled APSD service period. The present invention also enables an optimal logic for the unscheduled APSD service period and downlink audio delivery use. The present invention results in a lower power consumption because the amount of unnecessary unscheduled APSD service periods can be lowered. Furthermore, the station does not need to wait for the service period to terminate QoS Null frames, and instead can go directly to sleep after it has successfully transmitted the uplink audio data frame. The present invention also lowers the overall traffic load, because the AP does not need to transmit QoS NULL frames in order to terminate the unscheduled APSD service period.

It is conventionally known that the voice activity factor in a conversational speech can be around 40%. This means that a participant in a conversation speaks about 40% of the time. Silent compression reduces the amount of transmitted traffic on average by around 50% when it is applied. Therefore, when silent compression is used, the number of frames in each direction is reduced. The length of frames is also reduced, decreasing the amount of consumed transmission resources. For this reason, the present invention clearly reduces power and resource consumption during uplink silent compressed frames, as the invention enables the handling of silent compression traffic in an efficient way.

The present invention also lowers the power consumption in downlink streams by enabling longer triggering intervals. The present invention also lowers the overall traffic load by reducing uplink frame transmission.

With the present invention, application level signaling performs the stream set-up; the session initiation protocol (SIP) can be used to set-up streams, for example. The stream originator may use other networking technology than the recipient or recipients. Therefore, the recipient cannot negotiate the most suitable frame size or transmission interval for their network technology. By controlling the trigger interval, the station may obtain a more suitable data transmission flow for WLAN. For this reason, both the originator and the recipient can utilize improved network performance. The present invention can be used in virtually any mobile terminals, PDAs or other devices that use VoIP and unscheduled APSD, such as non-AP QSTA or non-AP Sta enabled devices as described in IEEE 802.11e.

These and other objects, advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 10 shows the transmittal of audio content to a terminal without uplink silent compression logic and unscheduled APSD handling logic, when the audio payload length and transmission interval of the RTP frames have an equal length; and FIG. 11 shows the transmittal of audio content to a terminal with uplink silent compression logic and unscheduled APSD handling logic, when the audio payload length and transmission interval of the RTP frames have equal length.

DETAILED DESCRIPTION OF THE INVENTION

Figure 1:
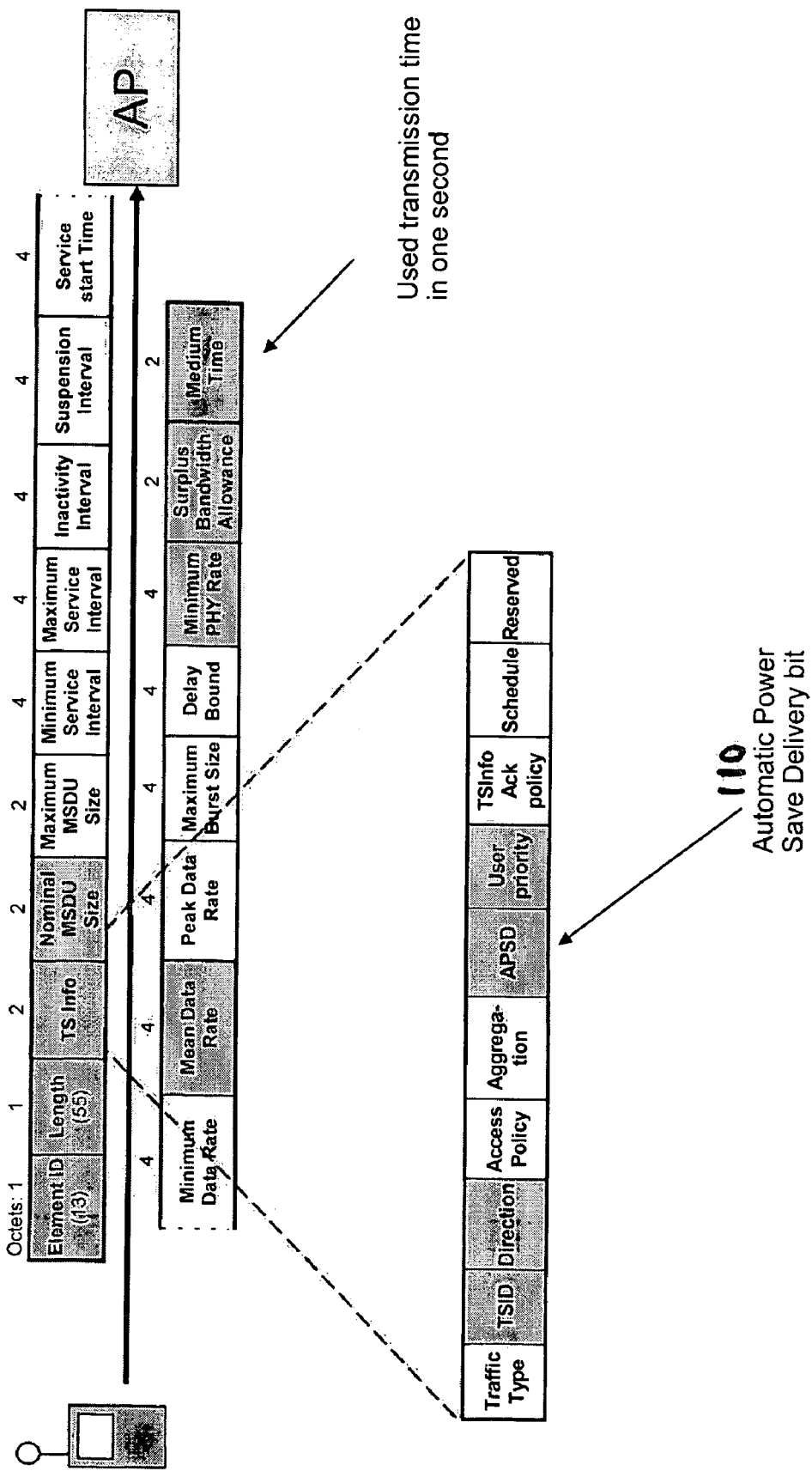
FIG. 1 is a representation of a traffic specification element including an APSD bit.
Figure 2:
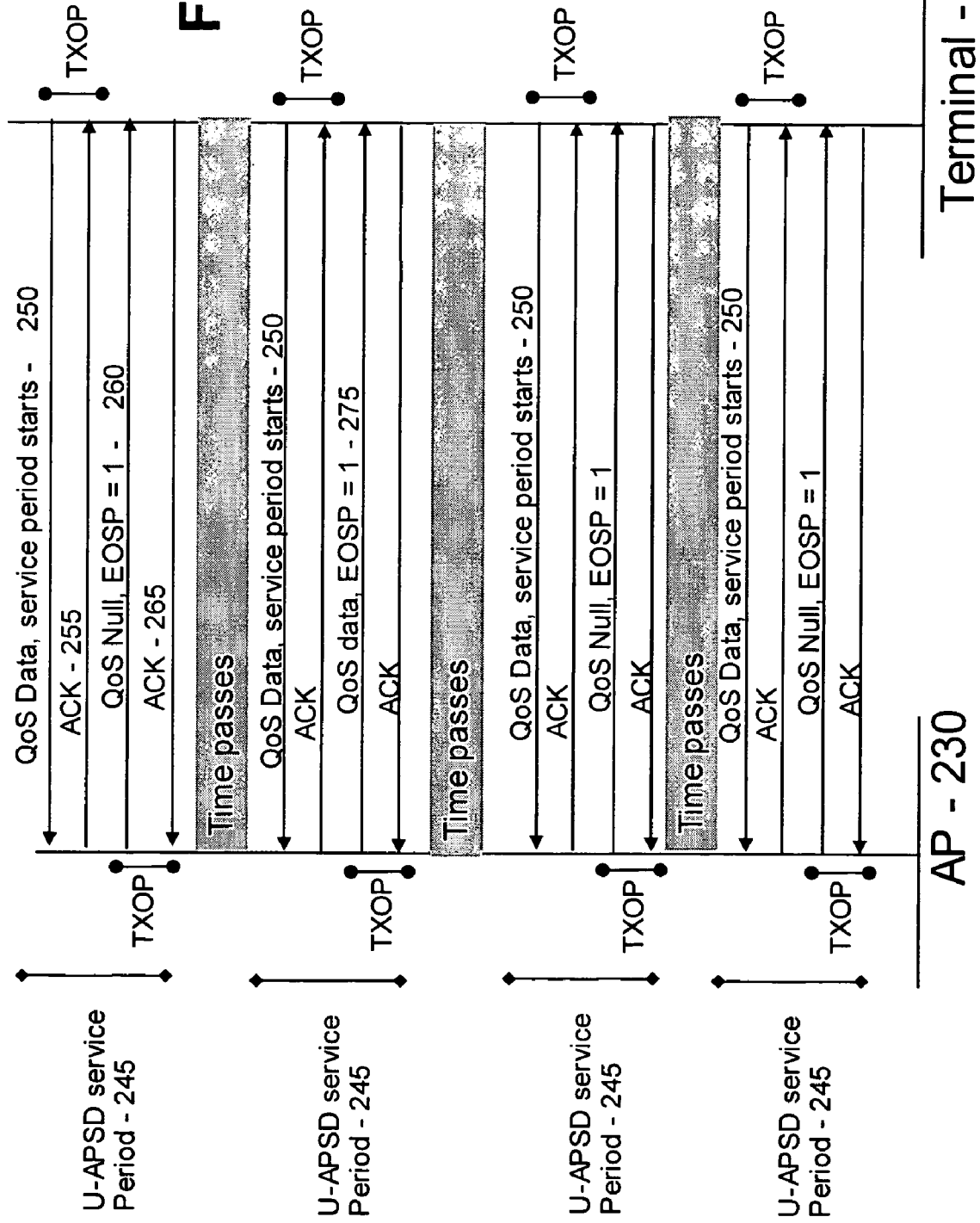
FIG. 2 shows the operation of unscheduled APSD service periods without the untrigger flag set operation logic of the present invention.
Figure 3:
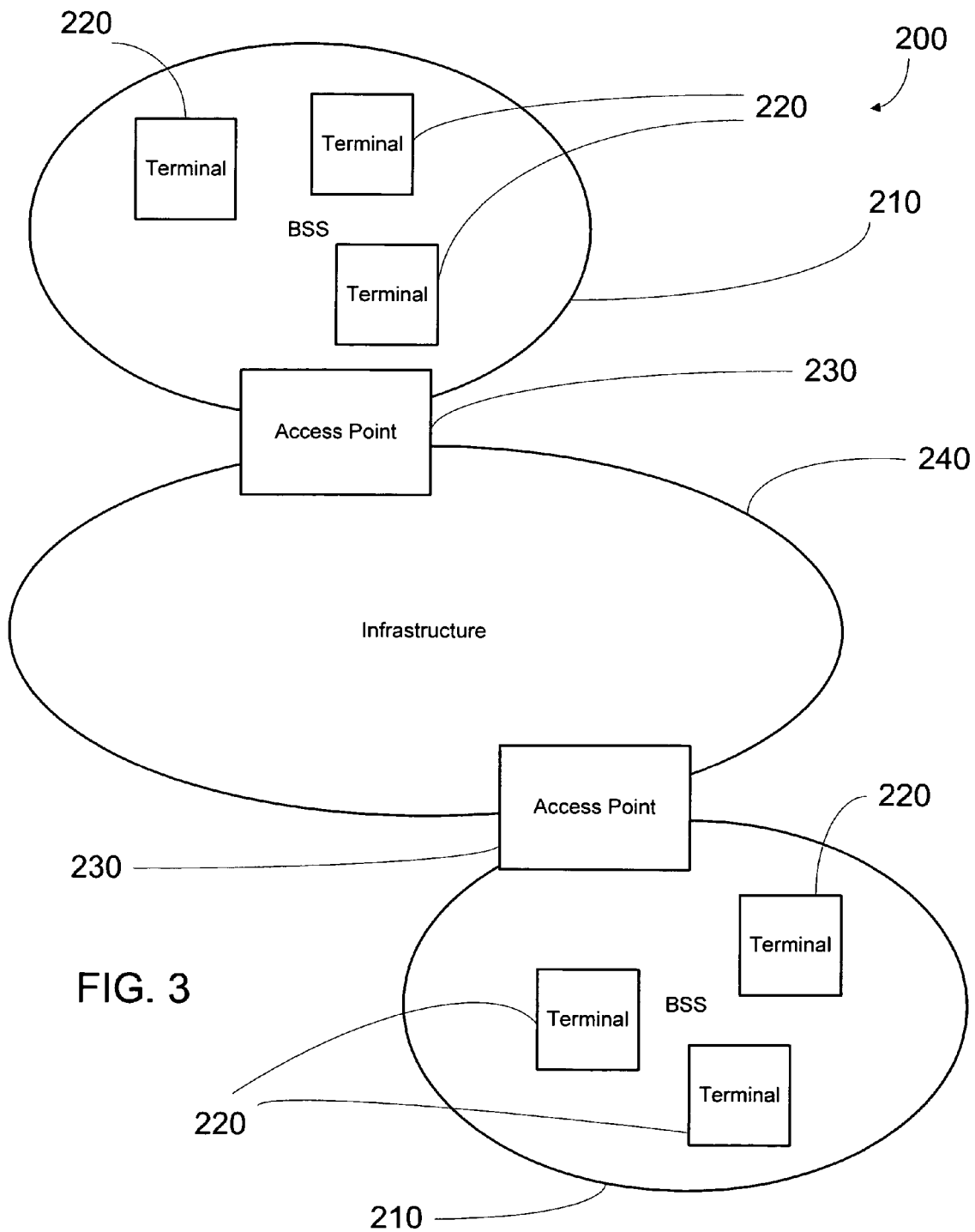
FIG. 3 is a representation of the components of an extended service set in an 802.11e wireless network.

FIG. 3 is a representation of the components of an extended service set 200 in an 802.11e wireless network. The extended service set 200 comprises a plurality of basic service sets 210, each of which includes a plurality of stations or terminals 220 and an access point 230. The access point 230 of each basic service set 210 is operatively connected to a distribution system 240, also referred to as network infrastructure.

Figure 4:
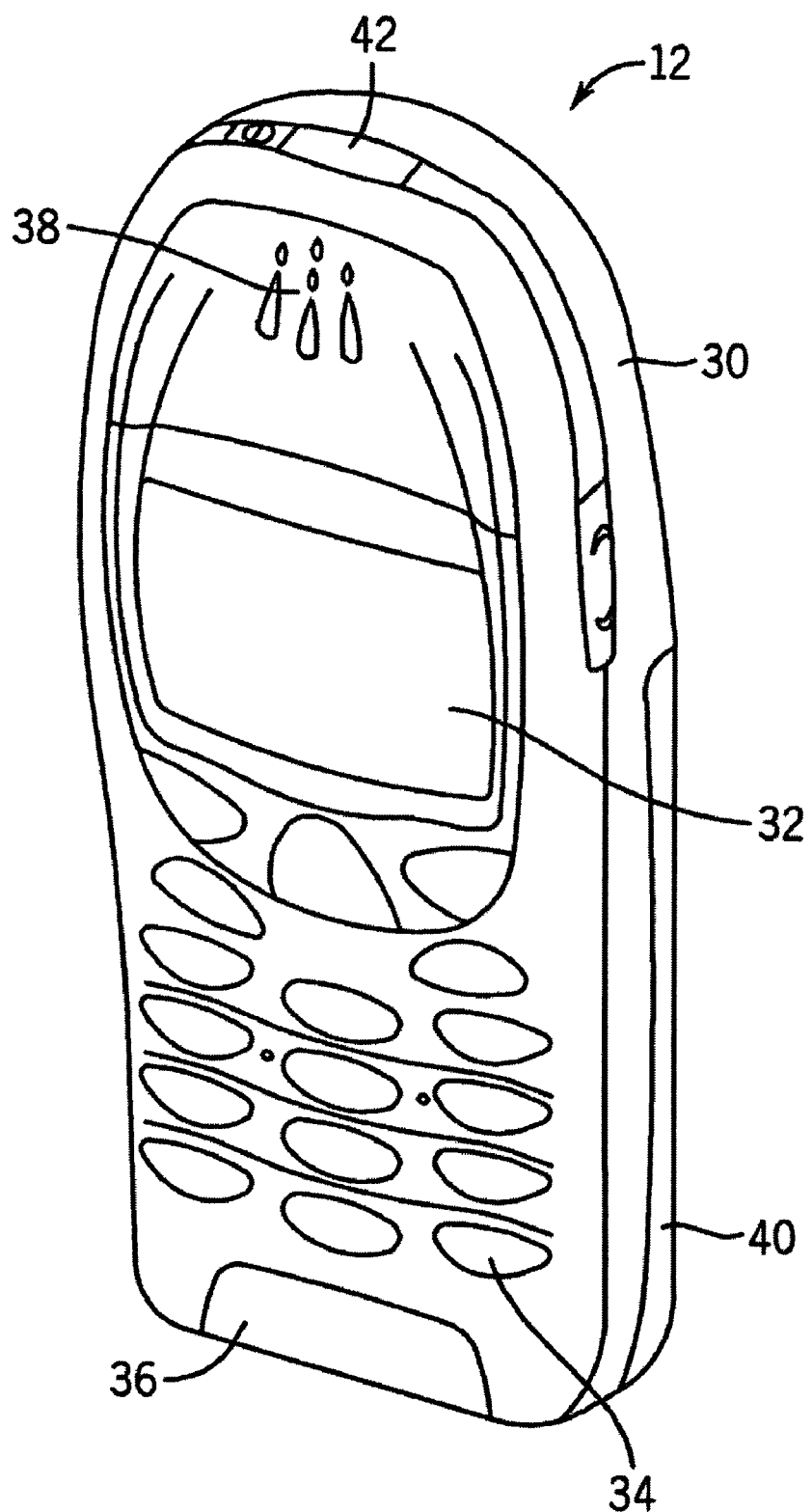
FIG. 4 is a perspective view of a mobile telephone that can be used in the implementation of the present invention.
Figure 5:
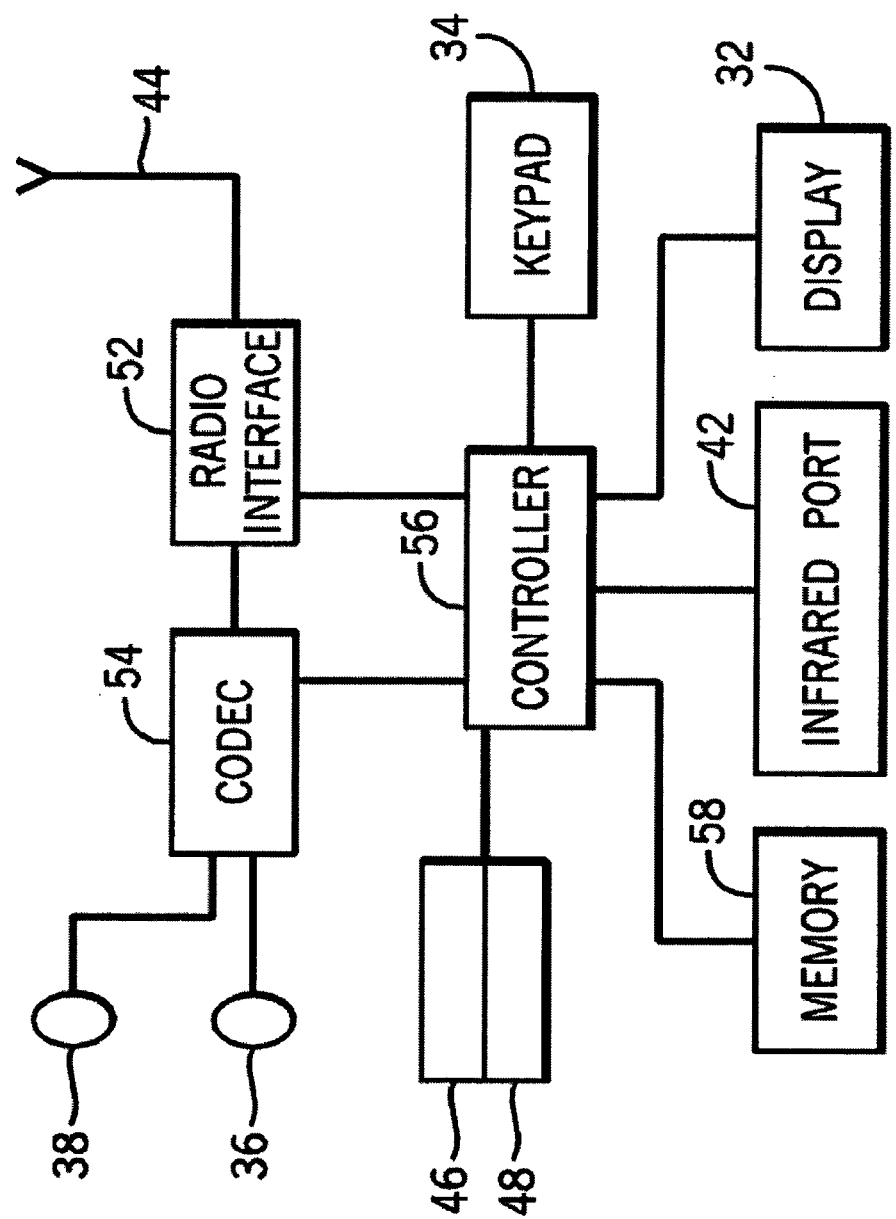
FIG. 5 is a schematic representation of the telephone circuitry of the mobile telephone of FIG. 3.

FIGS. 4 and 5 show one representative mobile telephone 12 which can serve as a station 220 according to the present invention. It should be understood, however, that the present invention is not intended to be limited to one particular type of mobile telephone 12 or other electronic device. The mobile telephone 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a universal integrated circuit card (UICC) according to one embodiment of the invention, a card reader 48, radio interface circuitry 52, codec circuitry 54, a controller or processor 56 and a memory 58. Individual circuits and elements are all of a type well known in the art, for example in the Nokia range of mobile telephones. It should also be noted that many of the same components can also be found in the access points 230 for a particular basic service set 210.

Figure 6:
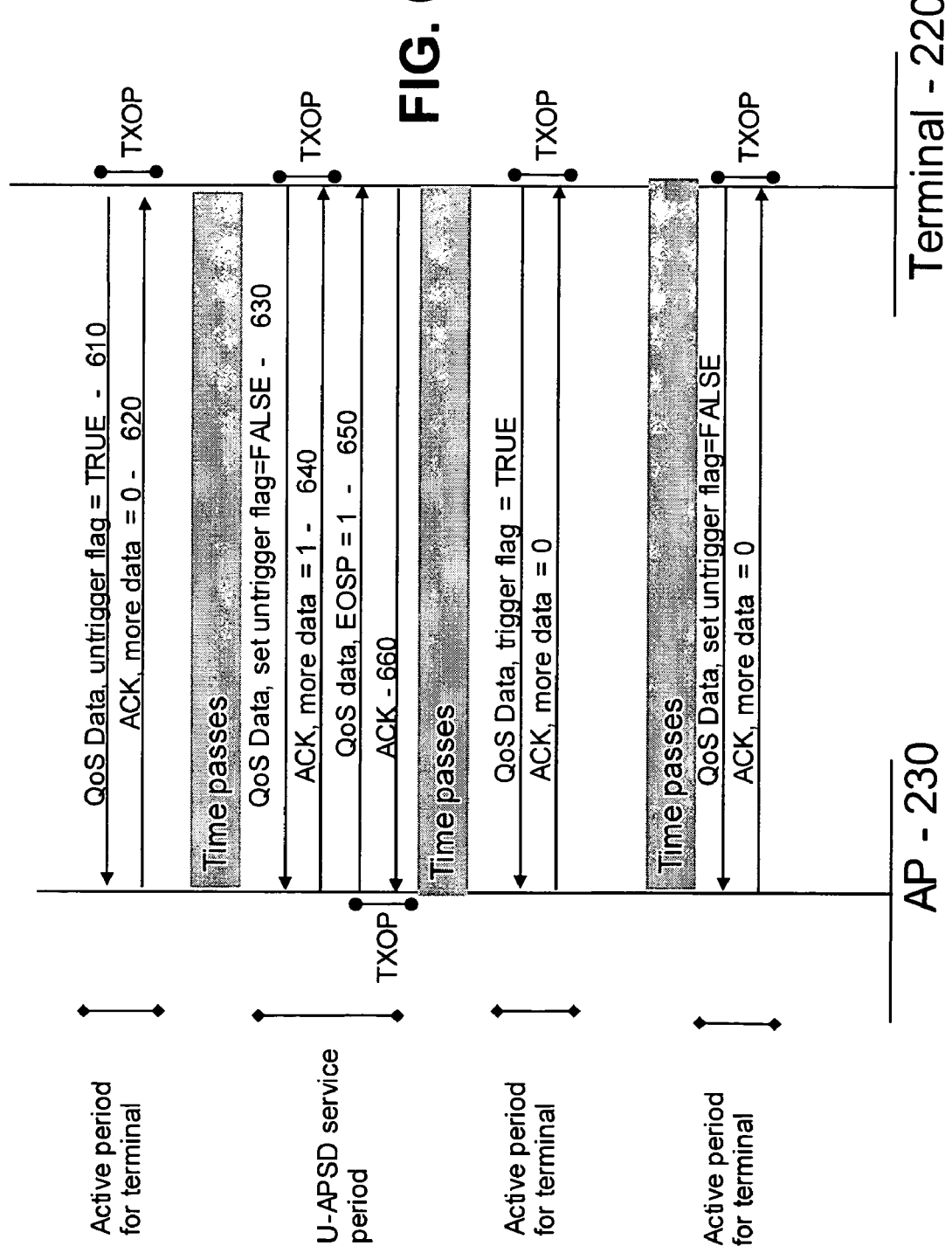
FIG. 6 shows the selective initiation of APSD services periods through the use of an untrigger flag set operation logic according to one embodiment of the present invention.

FIG. 6 shows the interaction between the same terminal 220 and access point 230 when untrigger flag logic is used according to the principles of the present invention. When a call is initiated, the terminal 220 sets the untrigger flag as "true" to all "triggering" frames according to the predetermined uplink triggering interval discussed below. This means that every uplink frame triggers. The predetermined uplink triggering interval can based on, e.g., voice codec properties and the amount of voice data which is carried in each frame. If the terminal does not receive any downlink audio data frames for a certain time period which can be, for example, based on the silent compression audio frame period or the length of voice (in milliseconds) in one or more audio frames, and receives silent compression frames instead, which do not necessarily contain any audio payload, then the terminal 220 starts to set the untrigger flag as "false" according to the silent period indication frame transmission interval. Setting the untrigger flag as "false" means, in an exemplary embodiment, that the untrigger flag is a single bit value of '0'. Correspondingly, the "true" value for the single flag bit can be '1'. The silent period indication frames can be silent compression frames used in voice codecs or other frames indicating an idle period in the actual communication processed according to the predetermined uplink triggering interval. The actual communications may be video, audio or other data. The silent period indication frame transmission interval parameter can be voice codec or other application-specific. The application-specific interval therefore defines the minimum triggered service period before the silent period indication frame. For example, an adaptive multi-rate (AMR) codec creates an packet within 20 ms and a silent compression packet within 80 ms. Therefore, the packet creation interval of 20 ms can be used as the predetermined uplink triggering interval for the codec if no silent compression is needed. The triggering interval is determined in the case of silent period detection frames based upon 80 ms intervals for silent compression packets. The information is applied to the formula described below in order to calculate the triggering interval. Therefore, silent period indication can comprise, but is not limited to, information about the interval of silent compression audio frames, information about the contents of silent compression frame contents (which can include, for example, the background noise level), information regarding the QoS of the connection, and information concerning the length or amount of data to be expected of a silent compression frame. It should be understood that, although the transmission of audio frames are discussed herein, the triggering of transmission of frames other than audio frames can be used with the present invention.

The terminal may return to the set untrigger flag "false" with every uplink frame if the terminal 220 receives an acknowledge frame with a set "more data" bit from the access point 230. The terminal 220 needs to send an extra QoS Null signal with the untrigger flag set to "false" in order to receive the buffered data.

If the received buffered data comprises audio data or comes from other applications, and if the terminal 220 knows that it will receive more data, then the terminal 220 sets the untrigger flag to "false" to trigger all frames and receive downlink data. If other applications or TCP/FTP data transfer applications need to exchange a significant amount of data, the terminal can set itself to a full power state or use other logic for a decision on the frequency of listening periods.

If the terminal has a significant amount of data in the UL transmission buffer that is awaiting transmission to an access point, then the terminal sets itself to a full power operation mode and returns to the U-APSD operation mode after the data has been transmitted. If the amount of transmitted UL data allows for power save use (i.e., UL frames are created to be bursty), then the terminal may benefit from U-APSD power saving during times when the UL transmission buffer is empty.

If the terminal uses a normal acknowledgment mode and transmits more than one frame in TXOP, then it does not trigger (i.e., sets the untrigger flag to "true") in the first transmitted frame. If the "more data" bit in the ACK for the first frame shows that the access point has buffered data for the terminal, then the next transmitted frame in TXOP triggers the U-APSD service period. This can be achieved by setting the untrigger flag to "false" in the next transmitted frame. This logic may be applied for both TCP data and real time stream transmissions.

As shown in FIG. 6, at the beginning of an active period for the terminal 220, the terminal 220 transmits QoS data to the access point 230 and sets the untrigger flag equal to "true" at step 610. In this situation, the acknowledgement at step 620 includes a "more data=0" indication. A subsequent transmittal of QoS data by the terminal 220 at step 630 includes a setting of the untrigger flag="false" according to the predetermined uplink triggering interval. If the access point 230 possesses additional data for transmission to the terminal, the access point 230 will respond with a "more data 1" indication, along with its acknowledgment of the original QoS data at step 640. Because the untrigger flag is set to "false" and there is additional information to transmit, a full unscheduled APSD service period is conducted. The access point transmits its QoS Data and an "EOSP=1" indication at step 650, which is acknowledged by the terminal 220 at step 660. Until the next predetermined uplink triggering interval, the provision of QoS data by the terminal 220 will be accompanied by a "untrigger flag=true" indication. In this system, the terminal 220 receives fewer transmissions from the access point, as QoS signals are not transmitted to the terminal 220 unless the untrigger flag is set to false and unless the access point 230 has QoS data to transmit. This consequently results in fewer uplink acknowledgments from the terminal 220 to the access point 230.

If the terminal 220 does not have buffered data during application-specific interval parameter service periods, and if the terminal 220 receives a "silent period indication" frame, it returns to set untrigger flags according to the application-specific interval parameter transmission interval. It should also be noted that the logic of the untrigger flag can also be reversed, such that a trigger flag is used instead and a signal sent, e.g., by the terminal 220 have a trigger flag value of "true" will trigger an access point 230 to send buffered data to the terminal 220. For example, the access point 230 may have received QoS information or other non-call-related data that the access point 230 must transmit to the terminal 220.

Figure 7:
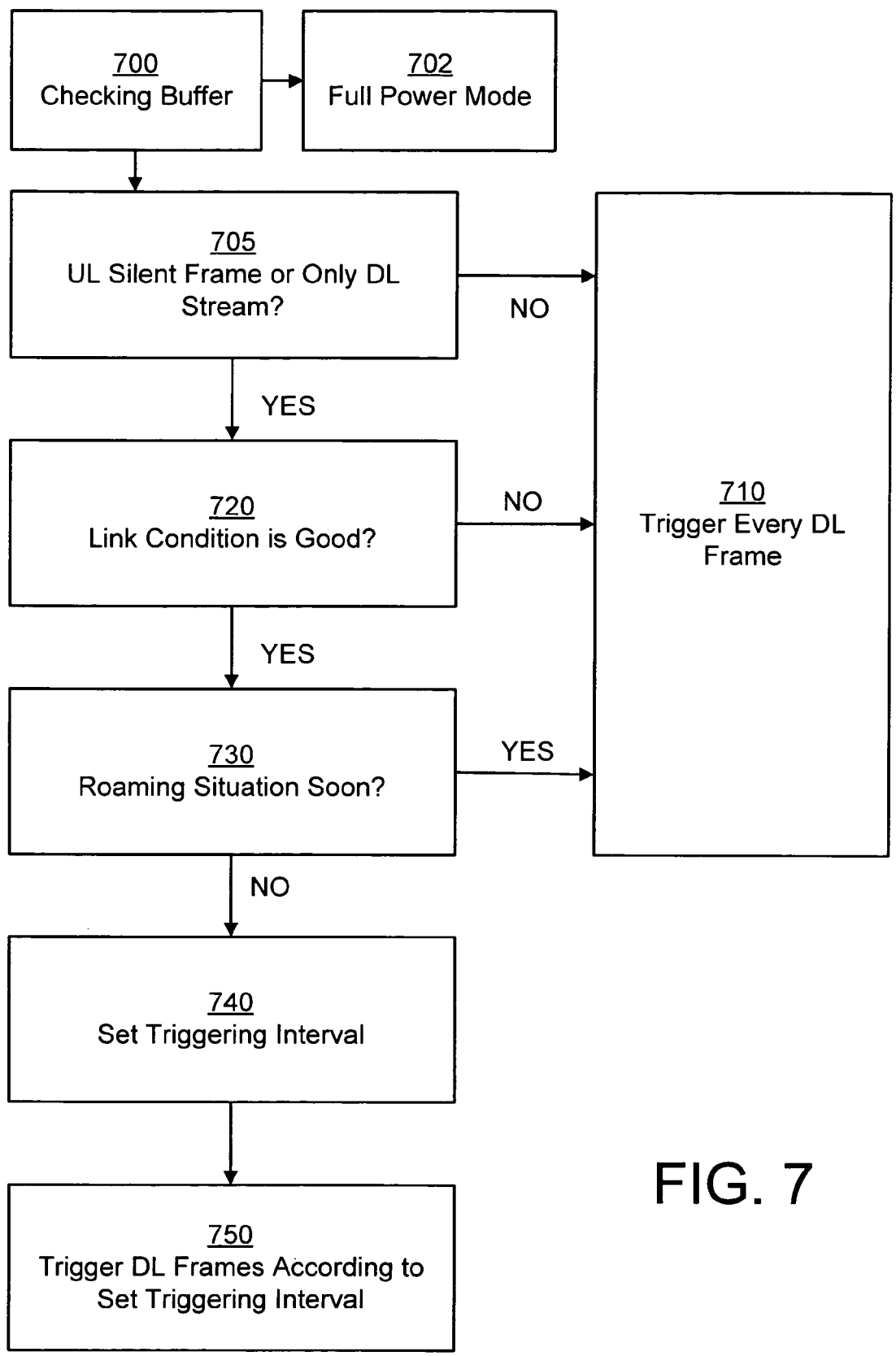
FIG. 7 is a flow chart showing the decision logic in setting a maximum triggering interval decision according to the present invention

FIG. 7 is a flow chart showing the initial logic for determining the uplink triggering interval according to the present invention. These conditions are separated into distinct decisions. At step 700, the buffer is checked to determine whether full power mode is necessary. At this point, it is determined whether the power save mode should be ended (and enter a full power mode) or to stay in the power save mode, and the triggering is set in accordance with existing logic. This is to ensure that, in the uplink direction, no buffer overflow will occur. Therefore, when the UL transmission buffer status allows, the use of uplink triggering can be continued instead of changing the system to operate in full-power mode to avoid buffer overflow. If uplink triggering cannot be continued, then at step 702, the system is placed in full-power mode, where no battery saving is performed. The first condition for triggering the interval setting is that a uni-directional stream or uplink silent compression is used. This is determined at step 705. If a uni-directional stream or uplink silent compression is not used, then the terminal 200 has uplink data to transmit, and triggering is automatic according to unscheduled APSD rules. This is represented at step 710.

If a uni-directional stream or uplink silent compression is used, then the second condition is based upon the link quality. The link quality is determined at step 720. If the link quality is bad, then data transfer may need extra transmissions. If the number of transmissions is reduced in a bad link, the probability of frame erasure will increase. For this reason, in bad link conditions all downlink frames are triggered, and the operation logic of the uplink trigger interval proceeds to step 710.

If the link is good, then the third condition involves roaming situations. In roaming situations, the terminal roams from an old access point to a new access point. It is very difficult to forward data to new access points and then transmit data to a roaming terminal before the maximum transmit delay of the data has passed. Therefore, it is determined whether the terminal is involved or will soon be involved in a roaming situation at step 730. If there is a roaming situation, then all downlink frames are triggered and the operation logic of the uplink triggering interval proceeds to step 710.

If there is no roaming situation, then at step 740 the triggering interval is set based upon a variety of factors, including the delay bound, the Jitter buffer size, codec capabilities, and the (RTP) packetization principle. The factors may vary between different applications such as voice codecs and the factors may therefore be application-specific. Jitter buffers are used to counter "jitter," also known as delay variation of received frames, introduced by packet networks so that a continuous playout of audio or video transmitted over the network can be ensured. At step 750, downlink frames are subsequently triggered according to the set triggering interval. The maximum trigger interval can be determined with the following formulas:

$$RTPPaylDurMaxDLTrInterval = RTP\_payload\_play\_duration/RTP\_Gen\_Interval \quad [1]$$

$$DelayBMaxDLTrInterval = (Delay\_Bound - SafeTime)/RTP\_Gen\_Interval \quad [2]$$

$$JitterBMaxDLTrInterval = (Jitter\_Buffer\_Size - SafeTime)/RTP\_Gen\_Interva \quad [3]$$

$$ULUpdTXMaxDLTrInterval = (UL\_update\_period)/RTP\_GenInterval \quad [4]$$

$$MaxULTriggerPeriod = MAX(RTPPaylDurMaxDLTrInterval, MIN(DelayBMaxDLTrInterval, JitterBMaxDLTrInterval, ULUpdTXMaxDLTrInterval)) \quad [5]$$

The variables for these equations are as follows:

RTP_payload_play_duration=length of media payload in one transmitted RTP frame.

RTP_Gen_Interval=time between transmitted RTP frames. (Silent suppression may use a different generation interval.)

Delay_Bound=size of the delay bound in the access point for the transmitted traffic.

SafeTime=Extra transmission time that is needed for uplink/downlink transmissions according to the unscheduled APSD principle and for terminal internal data handling time.

Jitter_Buffer_Size=size for the terminal's jitter buffer.

UL_update_period=Interval for silent parameters or stream the QoS reporting frame's transmission.

MaxULTriggerPeriod=Maximum uplink triggering interval. This value is scaled to the time between transmitted RTP frames. (Silent suppression may use a different generation interval).

Equation [1] calculates how many payload frames are in one transmitted frame. For example, if the data frame is transmitted between 20 ms, and each data frame contains a 40 ms payload, every second data frame (40 ms payload between 40 ms (2*20 ms)) needs to be received for playout. Equation [2] defines the maximum transmission time before the access point erases frames from the transmission buffer. The SafeTime is extra transmission time that is needed for uplink/downlink transmissions according to the unscheduled APSD principle and for terminal internal data handling time. Equation [3] is needed to ensure that the jitter buffer has a sufficient length for received frame playout. This equation is needed to ensure that the received frame's playout time is not exceeded when it is received. Equation [4] sets the uplink triggering interval according to silent parameters or the stream QoS reporting frame's transmission interval. Equation [5] defines the maximum triggering interval scaled to RTP frames generation interval.

The maximum trigger interval formulas scale the result to a RTP generation interval. If the MaxULTriggerPeriod is very large, the transition to the maximum trigger interval may need to include the use of a transition algorithm. For example, the triggering period may increase linearly, exponentially or with other logic. The algorithm may use historical information of the silent period lengths, link quality, roaming frequency or other parameters as input to define the current trigger interval. The trigger interval is not to be longer than the maximum trigger interval. A very large MaxULTriggerPeriod may be obtained in some downlink streams.

Figure 8:
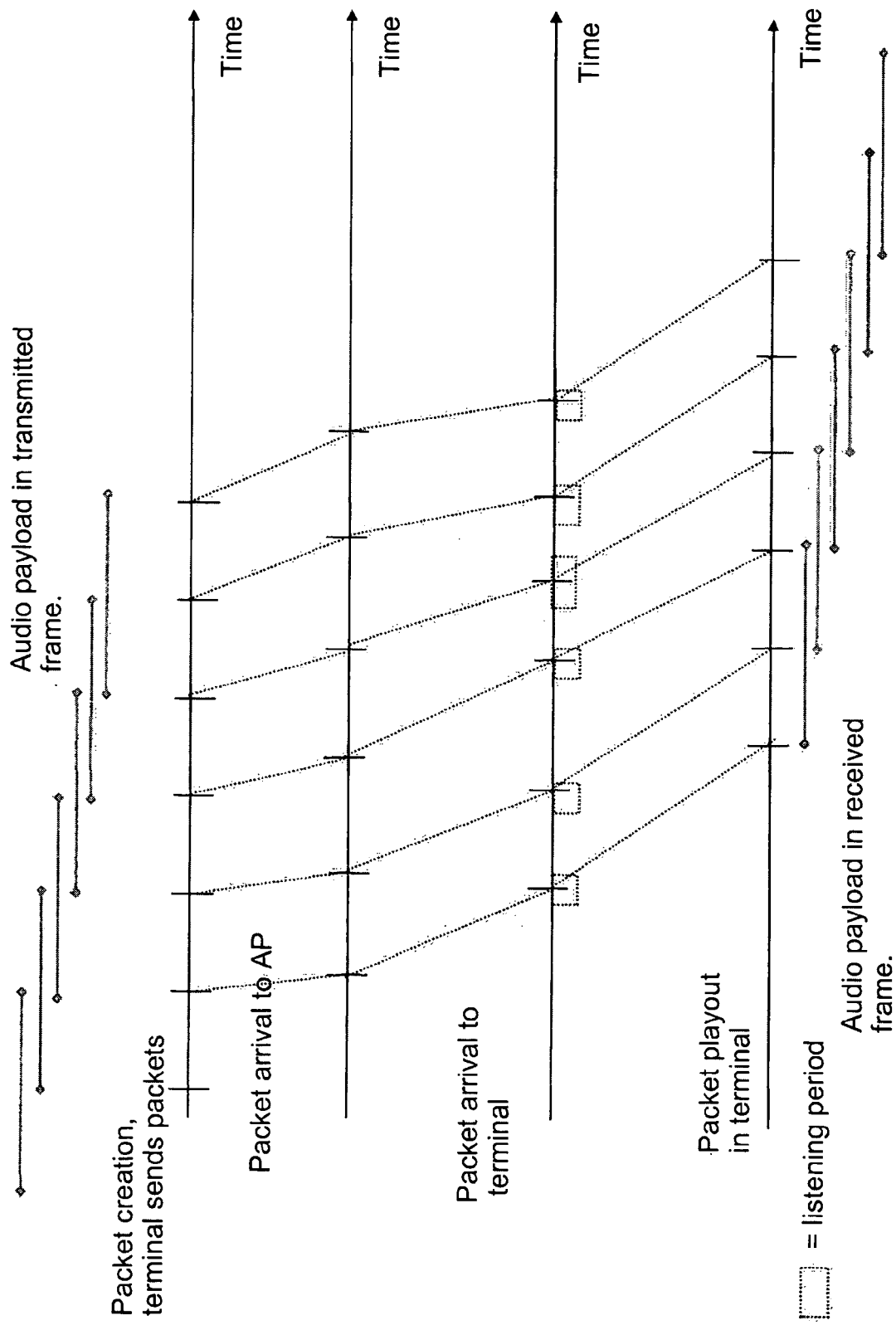
FIG. 8 shows the transmittal of audio content to a terminal without uplink silent compression and unscheduled APSD handling logic, wherein RTP frame contains a payload for a double transmission interval time.
Figure 9:
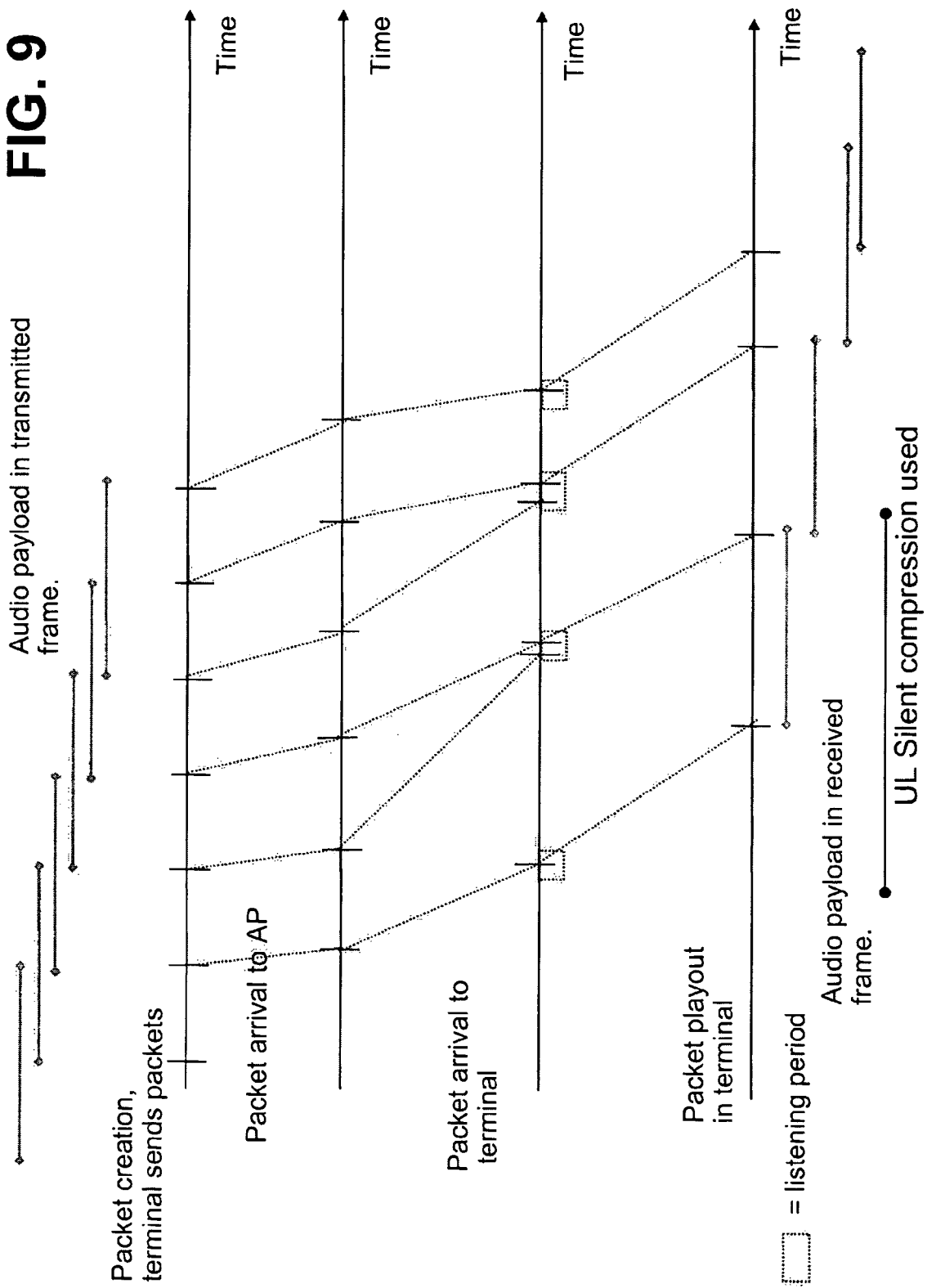
FIG. 9 shows the transmittal of audio content to a terminal with uplink silent compression and unscheduled APSD handling logic, wherein one RTP frame contains a payload for a double transmission interval time.

The effects of silent compression can be clearly observed in FIG. 9 when compared to FIG. 8 and FIG. 11 when compared to FIG. 10. FIG. 8 shows the process for playing real time protocol (RTP) frames of content on a terminal where each frame contains an audio payload for a two-transmission interval length. Either three or four audio packets also may be included in a single transmitted frame. FIG. 9 shows the identical process as in FIG. 8, but for a system with silent compression and unscheduled automatic power save delivery (APSD) according to the invention. As shown in FIG. 9, frames arrive at the terminal on fewer occasions when silent compression is used, as frames containing content that is not immediately needed by the terminal for playout are not immediately transferred from the access point to the terminal. Similarly, FIG. 11 show the effect of silent compression in Voice Over IP (VoIP) transmission in a normal one audio frame/one transmitted frame with unscheduled automatic power save delivery (APSD) according to the invention. FIG. 10 shows the transmittal of audio content to a terminal without uplink silent compression logic and unscheduled APSD handling logic, when the audio payload length and transmission interval have an equal length. FIG. 11 shows the same situation, but using silent compression. Once again, with silent compression, the terminal receives the content on fewer occasions, as frames containing content that is not immediately required for playout is delayed.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
setting a predetermined triggering interval by a terminal for controlling periods during which frames can be delivered to the terminal using a power save mechanism, the predetermined triggering interval being based upon an application-specific interval parameter;

setting an indicator indicating service period activities for selected frames based upon the predetermined triggering interval; and conducting an unscheduled automatic power save delivery service period for frames for which the indicator is set and for which the terminal receives an indication of additional data from a remote source;

wherein the predetermined triggering interval is set according to a calculated triggering interval if a uni-directional stream or silent compression is used by the terminal, if the link quality for the terminal reaches a predetermined threshold, and if the terminal is nqt in a roaming situation.

2. The method of claim 1, wherein no unscheduled automatic power save delivery service period is conducted for a frame if the indicator is not set.

3. The method of claim 1, wherein no unscheduled automatic power save delivery service period is conducted if the terminal receives an indication of no additional data from the remote source.

4. The method of claim 1, wherein the predetermined triggering interval is set according to automatic triggering rules if neither a uni-directional stream nor silent compression is used by the terminal.

5. The method of claim 1, wherein the predetermined triggering interval is set according to automatic triggering rules if the link quality for the terminal does not reach a predetermined threshold.

6. The method of claim 1, wherein the predetermined triggering interval is set according to automatic triggering rules if the terminal is in a roaming situation.

7. The method of claim 1, wherein the predetermined triggering interval is based upon the size of the delay bound for the access point for transmitted traffic, a jitter buffer size, codec capabilities, the length of media payload in one transmitted RTP frame, and the time between transmitted RTP frames.

8. The method of claim 1, wherein the predetermined triggering interval comprises an interval for an untriggering flag, and wherein the unscheduled automatic power save delivery service period is conducted for frames for which the untriggering flag is false.

9. A computer program product, embodied on a non-transitory computer readable medium, comprising:

computer code for setting a predetermined triggering interval by a terminal for controlling periods during which frames can be delivered to the terminal using a power save mechanism, the predetermined triggering interval being based upon an application-specific interval parameter;

computer code for setting an indicator indicating service period activities for selected frames based upon the predetermined triggering interval; and computer code for conducting an unscheduled automatic power save delivery service period for frames for which the indicator is set and for which the terminal receives an indication of additional data from a remote source;

wherein the predetermined triggering interval is set according to a calculated triggering interval if a uni-directional stream or silent compression is used by the terminal, if the link quality for the terminal reaches a predetermined threshold, and if the terminal is not in a roaming situation.

10. The computer program product of claim 9, wherein no unscheduled automatic power save delivery service period is conducted for a frame if the indicator is not set.

11. The computer program product of claim 9, wherein no unscheduled automatic power save delivery service period is conducted if the terminal receives an indication of no additional data from the remote source.

12. The computer program product of claim 9, wherein the predetermined triggering interval is set according to automatic triggering rules if neither a uni-directional stream nor uplink silent compression is used by the terminal.

13. The computer program product of claim 9, wherein the predetermined triggering interval is set according to automatic triggering rules if the link quality for the terminal does not reach a predetermined threshold.

14. The computer program product of claim 9, wherein the predetermined triggering interval is set according to automatic triggering rules if the terminal is in a roaming situation.

15. The computer program product of claim 9, wherein the predetermined triggering interval is based upon the size of the delay bound for the access point for transmitted traffic, a Jitter buffer size, codec capabilities, the length of media payload in one transmitted RTP frame, and the time between transmitted RTP frames.

16. The computer program product of claim 9, wherein the predetermined triggering interval comprises an interval for an untriggering flag, and wherein the unscheduled automatic power save delivery service period is conducted for frames for which the untriggering flag is false.

17. The computer program product of claim 9, further comprising computer code for, if the terminal transmits more than one frame in TXOP, not setting the indicator.

18. The computer program product of claim 9, further comprising computer code for switching to a full power mode if the amount of data in a transmission buffer exceeds a predetermined threshold.

19. A terminal in at least selective communication with an access point of a basic service set, comprising: a processor; and a memory unit operatively connected to the processor and including:

computer code for setting a predetermined triggering interval for controlling periods during which frames can be delivered to the terminal using a power save mechanism, the predetermined triggering interval being based upon an application-specific interval parameter;

computer code for setting an indicator indicating service period activities for selected frames based upon the predetermined triggering interval; and computer code for conducting an unscheduled automatic power save delivery service period for frames for which the indicator is set and for which the terminal receives an indication of additional data from the access point;

wherein the predetermined triggering interval is set according to a calculated triggering interval if a uni-directional stream or silent compression is used by the terminal, if the link quality for the terminal reaches a predetermined threshold, and if the terminal is not in a roaming situation.

20. The terminal of claim 19, wherein no unscheduled automatic power save delivery service period is conducted for a frame if the indicator is not set.

21. The terminal of claim 19, wherein no unscheduled automatic power save delivery service period is conducted if the terminal receives an indication of no additional data from the remote source.

22. The terminal of claim 19, wherein the predetermined triggering interval is set according to automatic triggering rules if neither a uni-directional stream nor uplink silent compression is used by the terminal.

23. The terminal of claim 19, wherein the predetermined triggering interval is set according to automatic triggering rules if the link quality for the terminal does not reach a predetermined threshold.

24. The terminal of claim 19, wherein the predetermined triggering interval is set according to automatic triggering rules if the terminal is in a roaming situation.

25. The terminal of claim 19, wherein the predetermined triggering interval is based upon the size of the delay bound for the access point for transmitted traffic, a jitter buffer size, codec capabilities, the length of media payload in one transmitted RTP frame, and the time between transmitted RTP frames.

26. The terminal of claim 19, wherein the predetermined triggering interval comprises an interval for an untriggering flag, and wherein the unscheduled automatic power save delivery service period is conducted for frames for which the untriggering flag is false.

* * * * *